US006455658B1

(12) United States Patent
Okanishi et al.

(10) Patent No.: US 6,455,658 B1
(45) Date of Patent: Sep. 24, 2002

(54) FLUOROCOPOLYMER AND FILM MADE THEREFROM

(75) Inventors: Ken Okanishi; Keizo Shiotsuki; Ryoichi Fukagawa, all of Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/254,432

(22) PCT Filed: Sep. 4, 1997

(86) PCT No.: PCT/JP97/03097

§ 371 (c)(1),
(2), (4) Date: Mar. 9, 1999

(87) PCT Pub. No.: WO98/10000

PCT Pub. Date: Mar. 12, 1998

(30) Foreign Application Priority Data

Sep. 9, 1966 (JP) ............................................. 8-237726

(51) Int. Cl.[7] ...................... C08F 214/18; C08F 214/24; C08F 214/26; C08F 214/28
(52) U.S. Cl. .................... 526/348.8; 526/242; 526/250; 526/253; 526/254; 526/255
(58) Field of Search ................................. 526/250, 253, 526/254, 348.8, 255

(56) References Cited

U.S. PATENT DOCUMENTS 4,513,129 A  4/1985  Nakagawa et al. ......... 526/249
4,677,175 A  * 6/1987  Ihara .......................... 526/254

FOREIGN PATENT DOCUMENTS

| JP | 4924295 | 4/1974 |
| JP | 50-67888 | 6/1975 |
| JP | 57-38807 | 3/1982 |
| JP | 60-94411 | 5/1985 |
| JP | 60-248710 | 12/1985 |

* cited by examiner

*Primary Examiner*—Fred Zitomer
(74) *Attorney, Agent, or Firm*—Birch, Stewart, Kolasch & Birch, LLP

(57) ABSTRACT

A fluorine-containing copolymer comprising ethylene, tetrafluoroethylene, a fluorovinyl compound of the formula: $CH_2=CFRf$ in which Rf is a fluoroalkyl group having 2 to 10 carbon atoms, and hexafluoropropylene, in which a molar ratio of tetrafluoroethylene to ethylene is from 40:60 to 90:10, the content of the above fluorovinyl compound of the formula: $CH_2=CFRf$ is from 0.1 to 10 mole % based on the whole copolymer, and the content of hexafluoropropylene is from 0.1 to 30 mole % based on the whole copolymer. This fluorine-containing copolymer can provide films having good transparency and high tear strength, and such films are useful as weather-resistant protective films, films for agricultural housings, films for constructions, and the like.

8 Claims, No Drawings

FLUOROCOPOLYMER AND FILM MADE THEREFROM

This application is the national phase under 35 U.S.C. §371 of PCT International Application No. PCT/JP97/03097 which has an International filing date of Sep. 4, 1997 which designated the United States of America.

FIELD OF THE INVENTION

The present invention relates to a novel fluorine-containing copolymer and a film comprising the same. In particular, the present invention relates to a fluorine-containing polymer comprising ethylene and tetrafluoroethylene, which can be extrusion molded to provide a film having high transparency and tensile strength.

PRIOR ART

Ethylene-tetrafluoroethylene copolymers (hereinafter referred to as "ETFE") are widely used as materials of molded articles, wire coatings, linings, coatings, etc. since they have good chemical resistance, heat resistance, electrical properties and the like, and furthermore they are easily melt processed.

In these years, ETFE films are used as protective films of agricultural houses and building materials by making use of their good transparency and weather resistance.

JP-B-3-20405 discloses an ethylene-tetrafluoroethylene copolymer comprising ethylene, tetrafluoroethylene and a fluorovinyl compound of the formula:

$$CH_2=CFRf$$

wherein Rf is a fluoroalkyl group having 2 to 10 carbon atoms, in which a molar ratio of tetrafluoroethylene to ethylene is from 40:60 to 60:40 and the content of the fluorovinyl compound is from 0.1 to 10 mole % based on the whole copolymer.

However, films obtained by the extrusion molding of ETFE have a drawback that they have the large anisotropy of tear strength between a machine (extrusion) direction (MD) and a transverse direction (TD), that is, the tear strength in the transverse direction is lower than that in the machine direction They have another drawback that the tear strength of the films decreases as a molecular weight decreases. The films are required to have improved tear strength, particularly when they are used to cover agricultural houses.

In connection with transparency, films having a haze of about 60% or less at a film thickness of 2 mm are desired. To this end, a large amount of expensive fluorovinyl monomers should be copolymerized to impart such transparency to the films, but the use of fluorovinyl monomers in a large amount is disadvantageous from the economical viewpoint.

JP-A-49-24295 discloses a copolymer comprising ethylene, tetrafluoroethylene and hexafluoropropylene, and describes that the copolymerization of hexafluoropropylene improves the transparency of copolymer films. However, such an effect to improve the transparency is still insufficient. Hexafluoropropylene should be copolymerized in a large amount, when it is used alone as the third monomer. Furthermore, the use of hexafluoropropylene decreases the melting point of copolymers, and thus such copolymers cannot be used in applications requiring heat resistance.

SUMMARY OF THE INVENTION

One object of the present invention is to provide a novel fluorine-containing copolymer comprising ethylene and tetrafluoroethylene, which is extrusion molded to provide films having good transparency and tear strength.

The above object is accomplished by a fluorine-containing copolymer comprising ethylene, tetrafluoroethylene, a fluorovinyl compound of the formula:

$$CH_2=CFRf \qquad (1)$$

wherein Rf is a fluoroalkyl group having 2 to 10 carbon atoms, and hexafluoropropylene, in which a molar ratio of tetrafluoroethylene to ethylene is from 40:60 to 90:10, the content of the above fluorovinyl compound of the formula: $CH_2=CFRf$ is from 0.1 to 10 mole % based on the whole copolymer, and the content of hexafluoropropylene is from 0.1 to 30 mole % based on the whole copolymer.

DETAILED DESCRIPTION OF THE INVENTION

The molar ratio of tetrafluoroethylene to ethylene in the fluorine-containing copolymer of the present invention is generally from 40:60 to 90:10. The decomposition-starting temperature of the copolymer greatly decreases, as the proportion of ethylene increases. Thus, the amount of tetrafluoroethylene is preferably at least equimolar to ethylene. When the proportion of ethylene is too larger, a polymerization rate decreases. Thus, the molar ratio of tetrafluoroethylene to ethylene is preferably less than 70:30.

The first modifying monomer used in the present invention is a fluorovinyl compound of the above formula (1).

The number of carbon atoms in the Rf group is usually from 2 to 10. When the Rf group has only one carbon atom, the properties of copolymers are not satisfactorily modified or improved. When the number of carbon atoms in the Rf group exceeds 10, the polymerization reactivity of the compound disadvantageously decreases.

The Rf group is preferably a perfluoroalkyl group, or an ω-hydro- or ω-chloroperfluoroalkyl group from the viewpoint of heat resistance of obtained copolymers.

Among the fluorovinyl compounds (1), a fluorovinyl compound of the formula:

$$CH_2=CF(CF_2)_nH \qquad (2)$$

wherein n is an integer of 2 to 10 is preferable, and in particular, a fluorovinyl compound of the formula (2) in which n is 3 to 5 is preferable, from the viewpoint of copolymerization properties, the costs of monomer preparations, and the properties of obtained copolymers.

The content of a fluorovinyl compound (1) is usually in the range between 0.1 and 10 mole % based on the whole copolymer. When the content of a fluorovinyl compound (1) is less than the above lower limit, molded articles of the copolymers are cracked in the molding process, so that no acceptable products are obtained. When the content of a fluorovinyl compound (1) exceeds the above upper limit, obtained polymers become economically disadvantageous, since the fluorovinyl compound (1) is more expensive than ethylene and tetrafluoroethylene. The content of the fluorovinyl compound (1) is preferably from 0.1 to 6 mole % based on the whole copolymer.

The second modifying monomer used in the present invention is hexafluoropropylene. The content of hexafluoropropylene is generally in the range between 0.1 and 30 mole % based on the whole monomer, and a small amount of hexafluoropropylene can achieve the objects of the present invention.

When the content of hexafluoropropylene is less than the above lower limit, the anisotropy of the films is not sufficiently suppressed. When the content of hexafluoropropylene exceeds the above upper limit, a polymerization rate greatly decreases, which is economically disadvantageous. The content of hexafluoropropylene is preferably from 0.1 to 20 mole %, more preferably from 0.1 to 10 mole %, based on the whole copolymer.

The effect of hexafluoropropylene to improve the transparency of films is greatly enhanced by the copolymerization of the fluorovinyl compound (1) together with hexafluoropropylene.

In addition to the above four monomers, the fluorine-containing copolymer of the present invention may comprise at least one additional fluorine-containing monomer or fluorine-free monomer in an amount such that the object of the present invention is not impaired. Examples of such additional monomers include vinylidene fluoride, chlorotrifluoroethylene, trifluoroethylene, propylene, etc.

The fluorine-containing copolymer of the present invention may be prepared by any conventional methods employed to prepare ETFE, such as bulk polymerization, solution polymerization, suspension polymerization, emulsion polymerization, vapor phase polymerization, and the like.

In the industrial production, suspension polymerization in an aqueous medium is preferable, which uses fluorine-containing solvents, and organic peroxides as polymerization initiators.

Preferable examples of fluorine-containing solvents include hydrochlorofluorocarbons (e.g. $CH_3CClF_2$, $CH_3CCl_2F$, $CF_3CF_2CCl_2H$, $CF_2ClCF_2CFHCl$, etc.), and perfluoroalkanes (e.g. perfluorocyclobutane, $CF_3CF_2CF_2CF_3$, $CF_3CF_2CF_2CF_2CF_3CF_3CF_2CF_2$—$CF_2CF_2CF_3$, etc.). Among them, perfluoroalkanes are preferable.

The amount of a solvent is preferably in the range between 10 and 100 wt. % of water from the viewpoint of suspension properties and costs.

Examples of organic peroxides used as polymerization initiators includes hydrocarbon type organic peroxides such as diisobutylperoxide, diisopropyl peroxydicarbonate, di-n-propyl peroxydicarbonate, etc. Furthermore, a peroxide of the formula:

$$(XC_mF_{2m}COO)_2 \quad (3)$$

wherein X is a hydrogen atom, a fluorine atom or a chlorine atom, and m is an integer of 2 to 8 can be exemplified.

Specific examples of the organic peroxide of the formula (3) include diperfluoropropionylperoxide, di (ω-hydroperfluorohexanoyl)peroxide, di (ω-chloroperfluorohexanoyl)peroxide, etc.

A polymerization temperature is not limited. The polymerization temperature is usually from 0 to 100° C. in commercial production processes. In general, low temperatures are preferable to avoid the deterioration of heat resistance of copolymers due to the formation of ethylene-ethylene chains in the copolymers.

A polymerization pressure may usually be in the range between 0 and 50 kg/cm$^2$G. Polymerization processes are preferably carried out under a relatively low pressure of 1 to 20 kg/cm$^2$G The low pressure is also preferable from the viewpoint of the safety of operation. A polymerization pressure may be selected according to other polymerization conditions, such as the kinds, amounts and vapor pressure of used solvents, polymerization temperature, etc.

In the preparation process of the fluorine-containing copolymer of the present invention, any conventional chain transfer agents may be used to adjust the molecular weight of the copolymer. Examples of chain transfer agents are isopentane, n-pentane, n-hexane, cyclohexane, methanol, ethanol, carbon tetrachloride, chloroform, methylene chloride, methyl chloride, etc.

Films of the fluorine-containing copolymers of the present invention may be produced by any known methods such as extrusion molding, inflation forming, calendering, and the like.

The thickness of a film is not limited, and a film having any thickness may be used. The thickness of a film is usually from 10 to 500 μm, preferably from 30 to 300 μm, more preferably from 50 to 200 μm.

The present invention will be illustrated by the following examples.

Physical properties of the copolymers obtained in the examples are measured as follows:

Monomer Composition of Polymer

The monomer composition of a polymer is determined by $^{19}$F-NMR.

Melting Point

A melting peak is recorded when a polymer is heated at a heating rate of 10° C./min. with a Perkin-Elmer Type 7 Differential Scanning Calorimeter (DSC). Then, a temperature corresponding to the maximum of a melting peak is used as a melting point.

Melt Flow Rate

Using a KOKA type flow tester, the amount (g/10 min.) of a copolymer, which flows out from a nozzle having a diameter of 2 mm and a length of 8 mm in a unit period of time (10 minutes) at 300° C. under a load of 5 kg, is measured.

Haze (cloudiness)

The haze of a film is measured with a haze meter (manufactured by TOYO PRECISION INSTRUMENT MANUFACTURING Co., Ltd.).

Tear Strength

The tear strength of a film is measured with an Elmendorf tear tester (manufactured by TOYO PRECISION INSTRUMENTS MANUFACTURING Co., Ltd.).

EXAMPLE 1

In a glass-lined autoclave having an internal volume of 4 liters, deoxygenated water (1 liter) was charged, and the internal space of the autoclave was evacuated. Then, perfluorocyclobutane (105 g) and hexafluoropropylene (150 g) were charged into the autoclave, and the internal temperature was maintained at 35° C. After that, $CH_2$=$CF(CF_2)_3H$ (8.0 g) and cyclohexane (4.0 g) were charged into the autoclave, and then the mixed gas of tetrafluoroethylene and ethylene (a molar ratio of 83:17) was injected up to 12 kgf/cm$^2$G while stirring. Thereafter, di-n-propyl peroxydicarbonate (4.0 g) was charged to initiate polymerization.

Then, the polymerization was carried out for 4.2 hours while additionally charging the mixed gas of tetrafluoroethylene, ethylene and $CH_2$=$CF(CF_2)_3H$ (a molar ratio of 53.5:45.5:1.5) into the autoclave to maintain the internal pressure at 12 kgf/cm$^2$G, since the internal pressure decreased as the polymerization proceeded.

After the termination of the polymerization, the residual monomers and solvent were recovered, and the product was washed and dried. Thus, a powdery polymer (116 g) was obtained.

Monomer composition:

Molar ratio of tetrafluoroethylene: ethylene:$CH_2$=$CF(CF_2)_3H$: hexafluoropropylene=52.8:43.0:1.6:2.6

Melting point: 250° C.

Melt flow rate: 9.0 g/10 min.

Haze of a 2 mm thick sheet: 43.6%

EXAMPLE 2

Polymerization was carried out for 3.5 hours in the same manner as in Example 1 except that the charged amounts of $CH_2=CF(CF_2)_3H$ and cyclohexane were changed to 4.0 g and 5.0 g, respectively, and the molar ratio of a supplemented mixed gas of tetrafluoroethylene, ethylene and $CH_2=CF(CF_2)_3H$ was changed to 53.4:45.8:0.76, and a powdery polymer (112 g) was obtained.

Monomer composition:

Molar ratio of tetrafluoroethylene: ethylene:$CH_2=CF(CF_2)_3H$: hexafluoropropylene=53.0:43.4:0.8:2.8

Melting point: 256° C.

Melt flow rate: 9.1 g/10 min.

Haze of a 2 mm thick sheet: 56.9%

EXAMPLE 3

Polymerization was carried out for 3.6 hours in the same manner as in Example 1 except that the charged amounts of perfluorocyclobutane, hexafluoropropylene and $CH_2=CF(CF_2)_3H$ were changed to 950 g, 50 g and 2.0 g, respectively, and the molar ratio of a supplemented mixed gas of tetrafluoroethylene, ethylene and $CH_2=CF(CF_2)_3H$ was changed to 53.6:46.0:0.38, and a powdery polymer (121 g) was obtained.

Monomer composition:

Molar ratio of tetrafluoroethylene:ethylene:$CH_2=CF(CF_2)_3H$: hexafluoropropylene=51.9:42.8:0.4:4.9

Melting point: 247° C.

Melt flow rate: 8.8 g/10 min.

Haze of a 2 mm thick sheet: 53.9%

EXAMPLE 4

Polymerization was carried out for 5.8 hours in the same manner as in Example 3 except that the charged amounts of perfluorocyclobutane, hexafluoropropylene and cyclohexane were changed to 635 g, 635 g and 2.0 g, respectively, and the molar ratio of a supplemented mixed gas of tetrafluoroethylene, ethylene and $CH_2=CF(CF_2)_3H$ was changed to 53.6:46.0:0.38, and a powdery polymer (121 g) was obtained.

Monomer composition:

Molar ratio of tetrafluoroethylene: ethylene: $CH_2=CF(CF_2)_3H$: hexafluoropropylene=47.9:39.5:0.5:12.1

Melting point: 194° C.

Melt flow rate: 14.9 g/10 min.

Haze of a 2 mm thick sheet: 14.3%

EXAMPLE 5

Polymerization was carried out for 6.9 hours in the same manner as in Example 3 except that the charged amounts of perfluorocyclobutane, hexafluoropropylene and cyclohexane were changed to 400 g, 800 g and 1.0 g, respectively, and the molar ratio of a supplemented mixed gas of tetrafluoroethylene, ethylene and $CH_2=CF(CF_2)_3H$ was changed to 53.6:46.0:0.38, and a powdery polymer (131 g) was obtained.

Monomer composition:

Molar ratio of tetrafluoroethylene:ethylene:$CH_2=CF(CF_2)_3H$: hexafluoropropylene=46.0:37.6:0.4:16.0

Melting point: 180° C.

Melt flow rate: 8.7 g/10 min.

Haze of a sheet having a thickness of 2 mm: 14.7%

EXAMPLE 6

Polymerization was carried out for 4.0 hours in the same manner as in Example 1 except that the charged amounts of perfluorocyclobutane, hexafluoropropylene, $CH_2=CF(CF_2)_3H$ and cyclohexane were changed to 800 g, 400 g, 1.0 g and 3.0 g, respectively, and the molar ratio of a supplemented mixed gas of tetrafluoroethylene, ethylene and $CH_2=CF(CF_2)_3H$ was changed to 53.7:46.1:0.19, and a powdery polymer (118 g) was obtained.

Monomer composition:

Molar ratio of tetrafluoroethylene: ethylene:$CH_2=CF(CF_2)_3H$: hexafluoropropylene=50.4:41.6:0.2:7.8

Melting point: 229° C.

Melt flow rate: 13.4 g/10 min.

Haze of a sheet having a thickness of 2 mm: 47.6%

EXAMPLE 7

Polymerization was carried out for 19 hours in the same manner as in Example 6 except that neither perfluorocyclobutane nor cyclohexane was charged, and the charged amount of hexafluoropropylene was changed to 1000 g, and a powdery polymer (130 g) was obtained.

Monomer composition:

Molar ratio of tetrafluoroethylene: ethylene: $CH_2=CF(CF_2)_3H$: hexafluoropropylene=42.0:28.8:0.2:29.0

Melting point: 111° C.

Haze of a 2 mm thick sheet: 10.0%

Comparative Example 1

Polymerization was carried out for 3.7 hours in the same manner as in Example 1 except that no hexafluoropropylene was used, the charged amounts of $CH_2=CF(CF_2)_3H$ and cyclohexane were changed to 8.0 g and 3.6 g, respectively, and the molar ratio of a supplemented mixed gas of tetrafluoroethylene, ethylene and $CH_2=CF(CF_2)_3H$ was changed to 52.2:46.3:1.5, and a powdery polymer (101 g) was obtained.

Monomer composition:

Molar ratio of tetrafluoroethylene:ethylene:$CH_2=CF(CF_2)_3H$=54.2:44.2:1.6

Melting point: 263° C.

Melt flow rate: 11.5 g/10 min.

Haze of a 2 mm thick sheet: 80.1%

The decreasing rate of a haze per one mole % of hexafluoropropylene was about 14%/1 mole % of hexafluoropropylene, in comparison with the result of Example 1.

Comparative Examples 2–4

Polymerization was carried out in the same manner as in Example 1 except that the charged amounts of perfluorocyclobutane and hexafluoropropylene were changes as shown in Table 1, the charged amount of cyclohexane was changed to 3.0 g, and the molar ratio of a mixed gas of tetrafluoroethylene and ethylene was 53.8:46.2, and a powdery polymer was obtained.

The transparency of the polymer film increased in proportional to the amount of hexafluoropropylene in the polymer. The increasing percentage was 4.8%/1 mole % of hexafluoropropylene.

TABLE 1

|  |  | C. Ex. 1 | C. Ex. 2 | C. Ex. 3 |
|---|---|---|---|---|
| Perfluorocyclobutane | g | 850 | 800 | 740 |
| Hexafluoropropylene | g | 350 | 400 | 460 |
| Polymer composition |  |  |  |  |
| tetrafluoroethylene | mole % | 50.8 | 50.5 | 50.0 |
| ethylene | mole % | 42.3 | 41.8 | 41.4 |
| hexafluoropropylene | mole % | 6.9 | 7.7 | 8.6 |
| Melting point | °C. | 236 | 232 | 217 |
| Haze | % | 55.9 | 54.4 | 47.8 |

EXAMPLE 8

In a glass-lined autoclave having an internal volume of 1280 liters, deoxygenated water (380 liters) was charged, and the internal space of the autoclave was evacuated. Then, perfluorocyclobutane (240 kg) and hexafluoropropylene (37.4 kg) were charged into the autoclave, and the internal temperature was maintained at 35° C. After that, $CH_2=CF(CF_2)_3H$ (1.125 kg) and cyclohexane (1.65 kg) were charged into the autoclave, and then the mixed gas of tetrafluoroethylene and ethylene (a molar ratio of 83:17) was injected up to 12 kgf/cm²G while stirring. Thereafter, di-n-propyl peroxydicarbonate (660 g) was charged to initiate polymerization.

Then, the polymerization was carried out for 49 hours while additionally charging the mixed gas of tetrafluoroethylene, ethylene, hexafluoropropylene and $CH_2=CF(CF_2)_3H$ (a molar ratio of 51.6:44.7:3.0:0.71) into the autoclave to maintain the internal pressure at 12 kgf/cm²G, since the internal pressure decreased as the polymerization proceeded.

After the termination of the polymerization, the content in the autoclave was recovered, and thus a powdery polymer (184 kg) was obtained.

Monomer composition:

Molar ratio of tetrafluoroethylene:ethylene:hexafluoropropylene:$CH_2=CF(CF_2)_3H$=53.1:42.9:3.1:0.9

Melting point: 256° C.

Melt flow rate: 39 g/10 min.

Haze of a 2 mm thick sheet: 56.9%

The obtained copolymer was extruded at a resin temperature of 320° C. to form a film having a thickness of 60 μm. The tear strength of the formed film is shown in Table 2.

Comparative Example 5

Polymerization was carried out in the same manner as in Example 8 except that no hexafluoropropylene was used, the charged amounts of $CH_2=CF(CF_2)_3H$ and cyclohexane were changed to 2.55 kg and 1.65 kg, respectively, and the molar ratio of a supplemented mixed gas of tetrafluoroethylene, ethylene and $CH_2=CF(CF_2)_3H$ was changed to 53.0:44.9:2.1, and a powdery polymer (240 kg) was obtained.

Monomer composition:

Molar ratio of tetrafluoroethylene:ethylene:$CH_2=CF(CF_2)_3H$=54.7:43.1:2.2

Melting point: 258° C.

Melt flow rate: 7.7 g/10 min.

Haze of a 2 mm thick sheet: 62.6%

The tear strength of a film, which was formed by the same method as in Example 8, is shown in Table 2.

The tear strength of the film in the extrusion direction was identical to that of Example 8, but the anisotropy was large and thus the film had a low tear strength in the transverse direction.

Comparative Example 6

Polymerization was carried out in the same manner as in Comparative Example 5 except that the charged amount of cyclohexane was changed to 1.83 kg, and a powdery polymer (240 kg) was obtained.

Monomer composition:

Molar ratio of tetrafluoroethylene:ethylene:$CH_2=CF(CF_2)_3H$=53.5:44.3:2.2

Melting point: 260° C.

Melt flow rate: 22 g/10 min.

Haze of a 2 mm thick sheet: 64.5%

The tear strength of a film, which was formed by the same method as in Example 8, is shown in Table 2.

The anisotropy of the film was somewhat improved in comparison with the film of Comparative Example 5, but the tear strength of the film deteriorated.

TABLE 2

|  | Example 8 | C. Ex. 5 | C. Ex. 6 |
|---|---|---|---|
| Tear strength (kgf/mm) |  |  |  |
| extrusion direction (MD) | 31.8 | 29.0 | 25.3 |
| transverse direction (TD) | 31.9 | 12.3 | 18.3 |
| Ratio of tear strength (MD/TD) | 1.00 | 0.42 | 0.72 |

What is claimed is:

1. A fluorine-containing copolymer comprising ethylene, tetrafluoroethylene, a fluorovinyl compound of the formula:

$$CH_2=CFRf \qquad (1)$$

wherein Rf is a fluoroalkyl group having 2 to 10 carbon atoms, and hexafluoropropylene, in which a molar ratio of tetrafluoroethylene to ethylene is from 40:60 to 90:10, the content of the above fluorovinyl compound of the formula: $CH_2=CFRf$ is from 0.1 to 10 mole % based on the whole copolymer, and the content of hexafluoropropylene is from 0.1 to 30 mole % based on the whole copolymer.

2. A fluorine-containing copolymer according to claim 1, wherein the content of hexafluoropropylene is from 0.1 to 20 mole % of the whole copolymer.

3. A fluorine-containing copolymer according to claim 1, wherein the molar ratio of tetrafluoroethylene to ethylene is from 50:50 to 70:30, the content of said fluorovinyl compound is from 0.1 to 6 mole % of the whole copolymer, and the content of hexafluoropropylene is from 0.1 to 20 mole % of the whole copolymer.

4. A fluorine-containing copolymer according to claim 1, wherein the content of hexafluoropropylene is from 0.1 to 10 mole % of the whole copolymer.

5. A fluorine-containing copolymer according to claim 1, wherein said fluorovinyl compound is a compound of the formula:

$$CH_2=CF(CF2)_nH$$

wherein n is an integer of 3 to 5.

6. A weather-resistant protective film comprising a fluorine-containing copolymer as claimed in claim 1.

7. A film for an agricultural housing comprising a fluorine-containing copolymer as claimed in claim 1.

8. A film for construction comprising a fluorine-containing copolymer as claimed in claim 1.

* * * * *